United States Patent [19]
Itou et al.

[11] Patent Number: 5,697,665
[45] Date of Patent: Dec. 16, 1997

[54] CORNER BRACKET OF SIDE DOOR FOR VEHICLES HAVING INTEGRAL MIRROR SUPPORT

[75] Inventors: Akira Itou; Tetsuya Niimi, both of Aichi-ken, Japan

[73] Assignee: Toyoda Gosei Co., Ltd., Aichi, Japan

[21] Appl. No.: 506,269

[22] Filed: Jul. 24, 1995

[30] Foreign Application Priority Data

Jul. 22, 1994 [JP] Japan ................... 6-191839
Jul. 22, 1994 [JP] Japan ................... 6-191840

[51] Int. Cl.⁶ .......................................... B60J 5/04
[52] U.S. Cl. .......................... 296/146.1; 359/871
[58] Field of Search .................. 296/146.1, 146.2, 296/146.3, 146.5, 146.9, 152; 49/502; 248/466, 475.1; 359/871, 877

[56] References Cited

U.S. PATENT DOCUMENTS

| | | | |
|---|---|---|---|
| 4,790,590 | 12/1988 | Ito et al. | 296/146.1 |
| 5,557,890 | 9/1996 | Levy et al. | 49/502 |

FOREIGN PATENT DOCUMENTS

| | | | |
|---|---|---|---|
| 5-116537 | 5/1993 | Japan | 296/146.2 |
| 6-64445 | 3/1994 | Japan . | |
| 6-137024 | 5/1994 | Japan | 49/502 |

*Primary Examiner*—Andrew C. Pike
*Attorney, Agent, or Firm*—Cushman Darby & Cushman IP Group of Pillsbury Madison & Sutro LLP

[57] ABSTRACT

A side door corner bracket is comprised of a hard plastic bracket base portion having a window glass sliding groove, and a lower rail portion including a window glass sliding groove that extends and continues downwardly from the bracket base portion. The hard plastic base and lower rail have a cover layer that includes a pair of sealing lips that extend along the window groove. The cover is made of a soft material such as soft plastics, soft elastics, or soft rubber.

4 Claims, 7 Drawing Sheets

CORNER BRACKET OF SIDE DOOR FOR VEHICLES HAVING INTEGRAL MIRROR SUPPORT

BACKGROUND OF THE INVENTION

1. Field of the Invention

The present invention relates to a corner bracket for a side door for vehicles having a hard plastic base and a soft cover layer provided with sealing lips. The corner bracket is particularly suitable for a front door of a vehicle. The bracket includes a lower guide portion for guiding a moving door window glass, or the bracket can include a mirror support portion for mounting a door mirror, and each portion integrally formed with the main base of the corner bracket.

2. Description of Related Art

Figure 1:
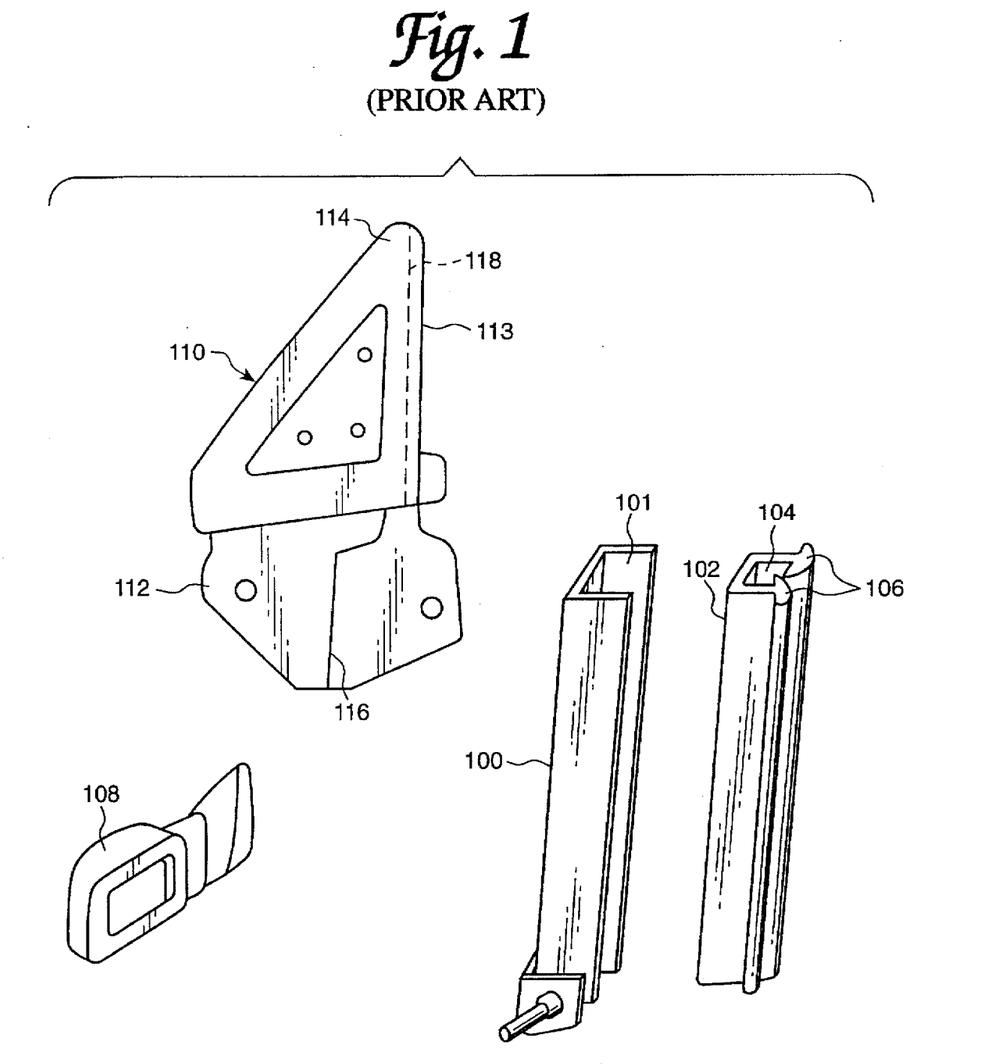
FIG. 1 is a perspective view showing an exploded view of a conventional corner bracket.

A conventional corner bracket is formed with nearly a triangular shape and is installed mainly at upper end edge corner of a vehicle side door, as shown in FIG. 1.

Such a conventional corner bracket is disclosed in the U.S. Pat. No. 4,790,590 or in Japanese Patent Laid-open publication No. Hei 06-64445.

A window regulator door windows up and down by using a driving force such as from a motor located in the side.

As shown in FIG. 1, the window regulator includes rail 100, mounted internally within a front side door panel (not shown in FIG. 1). A glass-run 102, which has a glass sliding groove 104 for guiding the sliding of a side door window glass (not shown in FIG. 1), is installed in a groove 101 of rail 100. Further, the glass-run 102 has a pair of inwardly extending sealing lips 106 on both sides of an opening of the glass sliding groove 104. The rail 100 is formed into a channel shape by press forming and it is slightly curved by a bending technique.

Corner bracket 110 forms part of the window regulator. Therefore, the corner bracket 110 also has a glass sliding groove 118, and a pair of sealing lips 113 on both sides of groove 118. The corner bracket 110 has a nearly triangular-shaped metal supporting base 112, and a cover layer 114 that includes sealing lips 113. The supporting base 112 is also formed by press forming, and is set in a cavity of an injection mold, as an insert member, so that melted soft plastic material or elastic material or rubber material, injected into the cavity, will cover base 112 where desired to form cover layer 114 and sealing lips 113. The metal supporting base 112 includes the glass sliding groove 118 which is located on a rear end portion of base 112 and it extends along a curved direction. Sealing lips 113 of the cover layer 114 are formed on both sides of glass sliding groove 118.

Rail 100 is connected to a lower end part 116 of base 112 by spot welding or screwing. Then, glass-run 102 is installed in groove 101 of the rail 100.

Corner bracket 110 also supports a door mirror 108 on an outer side surface which is corrected by bolts in a transverse direction. Then, assembly of the corner bracket 110 is finished. The window regulator is able to lift door window glass up and down by using a motorized link mechanism with the glass moving groove 104.

One proposal for reducing the number of elements of the corner bracket is to form the metal supporting base 112 and rail 100 as one piece to reduce manufacturing cost.

However, the metal supporting base 112 and rail 100 have complicated shapes. Therefore, manufacturing and shaping problems make it difficult to make one integral piece by press forming, and it is difficult to reduce the number of elements.

Also, after rail 100 is fixed to base 112, such as by spot welding, the glass-run 102 is installed in groove 101. Therefore, gaps can occur between grooves 104 and 118. Consequently, the sealing ability therebetween is reduced.

Because the door mirror 108 is supported on the outer side surface of the corner bracket 110 by bolts, the metal supporting base 112 needs a comparatively large side surface. It would also be desirable to reduce the weight of the corner bracket 110. A smaller size base 112 would make connecting the door mirror 108 difficult in view of a comparatively small area around an upper end edge corner of the front side door. Therefore, the conventional corner brackets have not been reduced in size nor weight.

SUMMARY OF THE INVENTION

The present invention overcomes the conventional corner bracket problems described above.

An object of the present invention is to provide a corner bracket for a side door for vehicles having a hard plastic base with a lower guide portion, for guiding the sliding of a door window glass, integrally formed therewith and including a soft cover layer with sealing lips.

Another object of the present invention is to provide a corner bracket for a side door that allows the mounting a door mirror.

Yet another object of the present invention is to provide a corner bracket having light weight, and the ability to easily connect a door mirror.

In accordance with the present invention, these objects are achieved by a corner bracket for a side door for vehicles that has a bracket base portion, with a window glass sliding groove, made of hard plastic. A rail, including a window glass sliding groove, extends downwardly from the bracket base portion and continues the window glass sliding groove from the bracket base portion. The rail portion is also made of hard plastic and is integrally formed with the bracket base portion. A cover layer, having a pair of sealing lips and made of soft material, such as soft plastics, soft elastics, or soft rubber, is formed over the base as desired, with integrally formed sealing lips of the cover layer located along the window glass sliding groove. The corner bracket also includes a hard plastic base door mirror support portion for mounting a door mirror.

Other objects, features, and characteristics of the present invention, as well as the methods and operation and functions of the related elements of the structure, will become apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENT

The preferred exemplary embodiments of the present invention will now be described with reference to the accompanying drawings.

Figure 2:
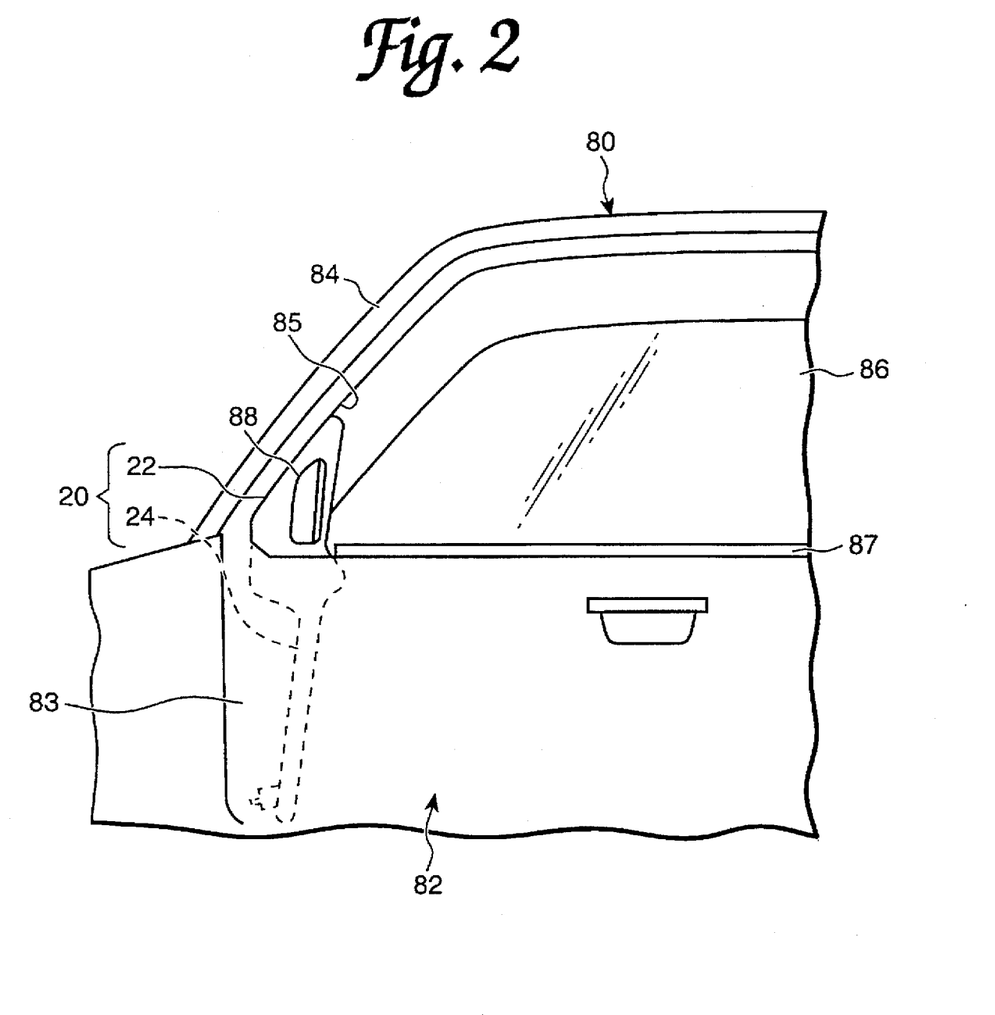
FIG. 2 is a side-elevational view of a portion of a vehicle and the corner bracket of a first embodiment of the present invention.

FIG. 2 shows a portion of a vehicle 80 having a sashless door; such a vehicle is called hardtop type vehicle. The vehicle 80 has a front side door 82, a front pillar 84, door window glass 86, a corner bracket 20, and a door mirror 88. The corner bracket 20 is installed at an upper end edge corner of a door panel 83 of the front side door 82.

The corner bracket 20 has a bracket base portion 22, on which the door mirror 88 is mounted. Base portion 22 located at upper edge corner over a door beltline 87. Cover bracket 20 also includes a lower guide portion 24, which integrally is formed to a lower end part of the bracket base portion 22, so as to extend downwardly. Therefore, the lower guide portion 24 is located interiorly of the door panel 83.

Figure 3:
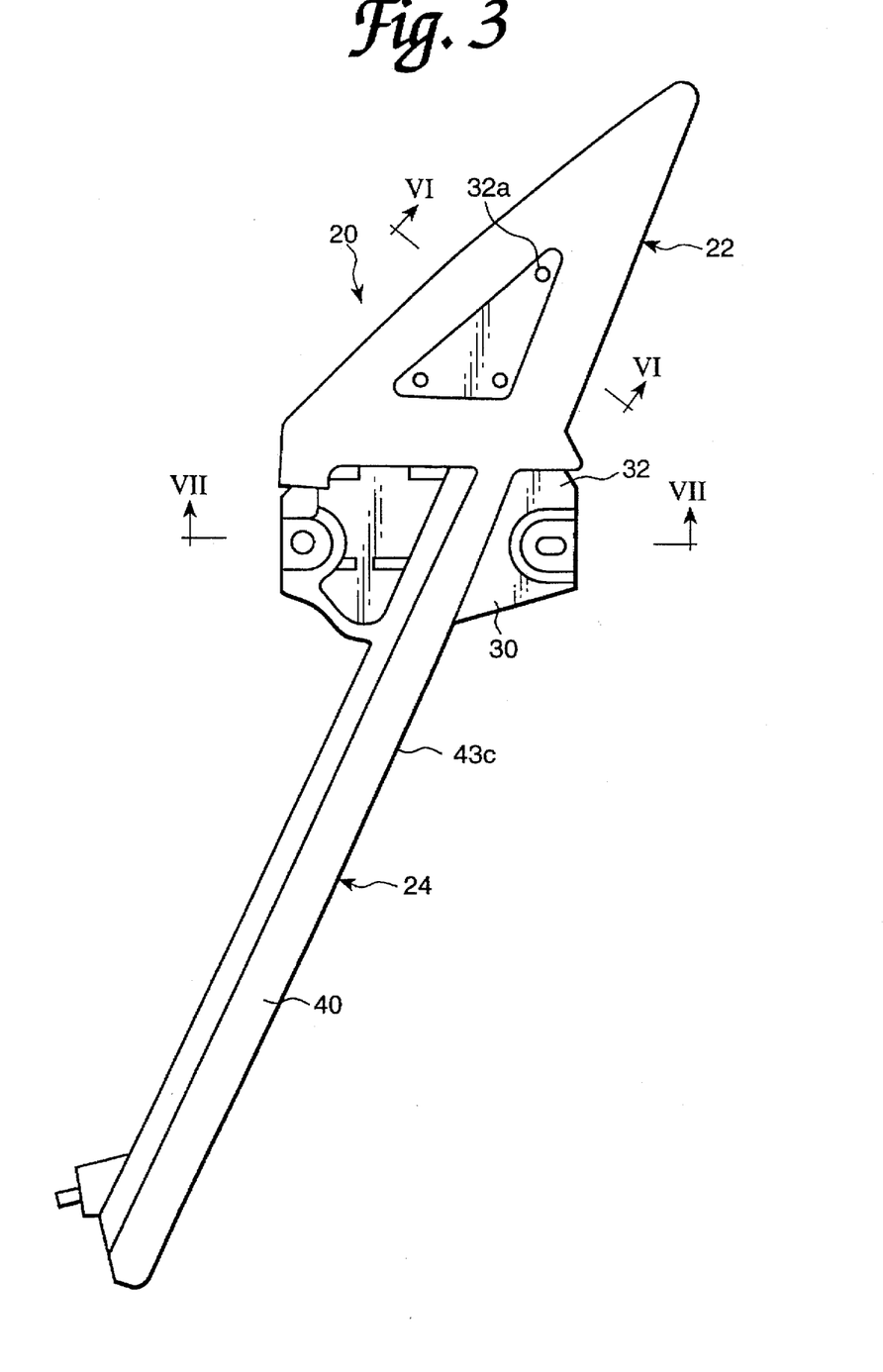
FIG. 3 is a side-elevational view of the corner bracket of the first embodiment of FIG. 2.

As shown in FIG. 3, the bracket base portion 22 and the lower guide portion 24 are comprised of a hard plastic base 30 and a cover layer 40. The cover layer 40 has a pair of sealing lips 43c, and the cover layer 40 is made of soft plastic. The cover layer 40 covers an outer peripheral portion of the hard plastic base 30.

Figures 4, 5:
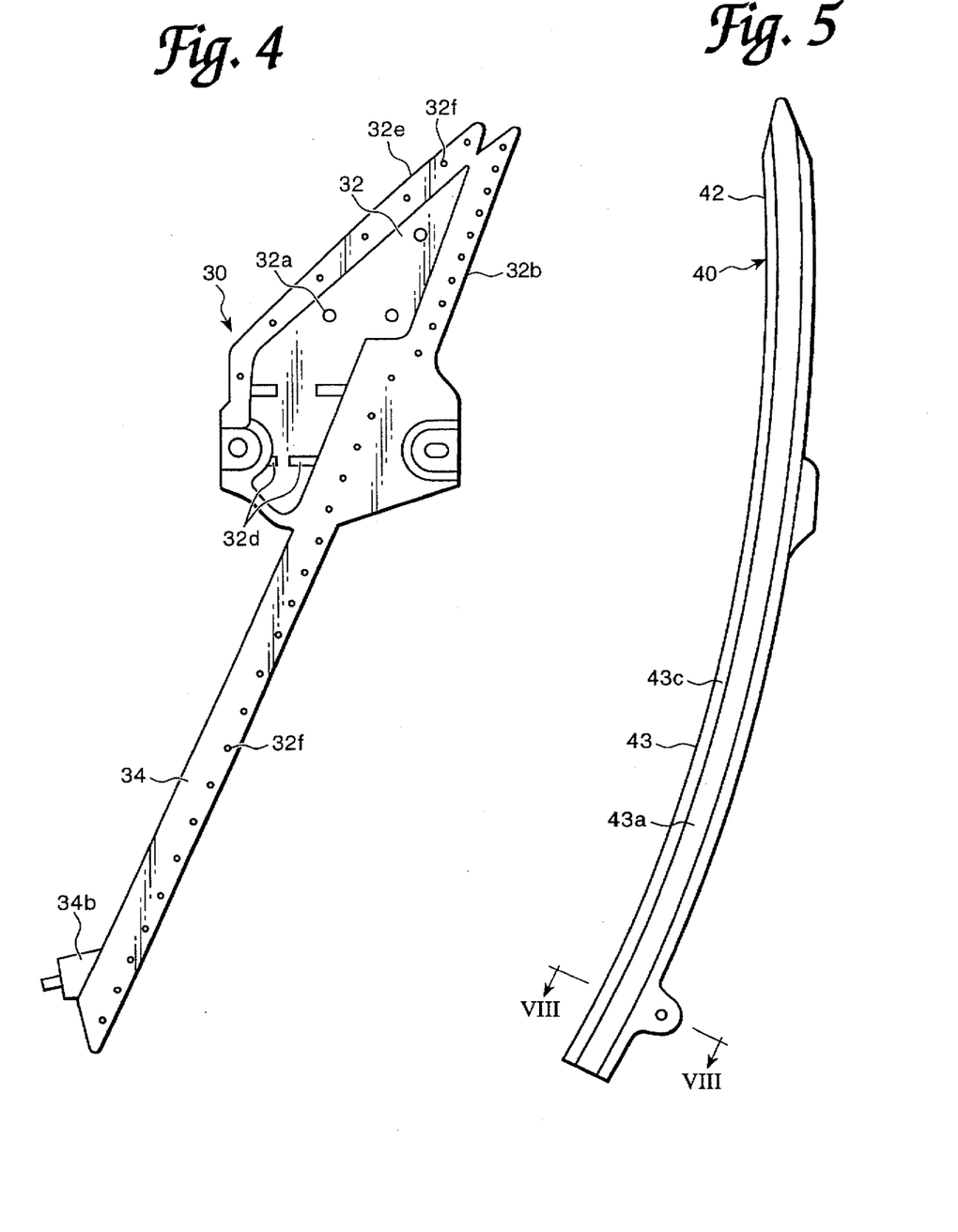
FIG. 4 is a side-elevational view of the base portion of the first embodiment.
FIG. 5 is an end view showing the corner bracket of the first embodiment in FIG. 3.

As shown in FIG. 4, the hard plastic base 30 is integrally formed with a main base part 32 and a guide rail part 34. The main base part 32 is formed to have a nearly triangular shape and is installed at the corner between the front pillar 84 and the door belt line 87 shown in FIG. 2. Further, the main base part 32 is provided with holes 32a for fixing the door mirror 88, and a groove part 32b, shown in FIG. 6, that is formed with a U-shaped cross section. Groove part 32b supports some part of the cover layer 40. Also, the main base part 32 includes corner parts 32c shown in FIG. 7, which are reinforced with triangular-shaped reinforced ribs 32d, respectively.

Figure 8:
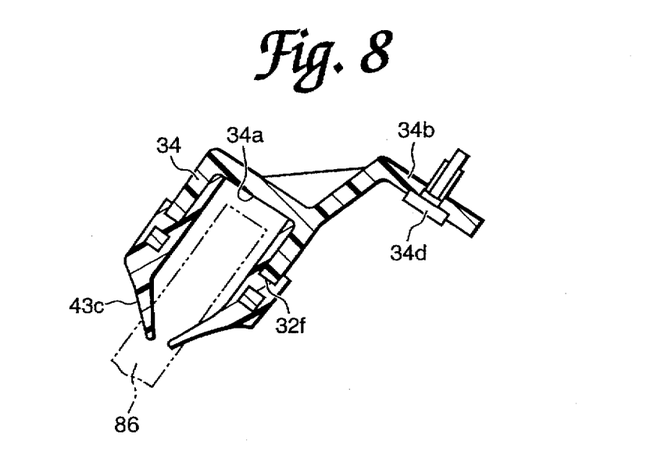
FIG. 8 is an enlarged, cross-sectional view of the corner bracket taken along line VIII—VIII in FIG. 5.

Also, the guide rail part 34 has a rail groove 34a, shown in FIG. 8, which extends and continues downwardly from groove 32b of the main base 32. The guide rail 34 also has a flange 34b at lower portion of it. The flange part 34b has a bolt 34d as an insert for fixing the corner bracket 20 to the door panel 83. Therefore, the flange part 34b is integrally formed with the lower guide portion 24.

Figure 6:
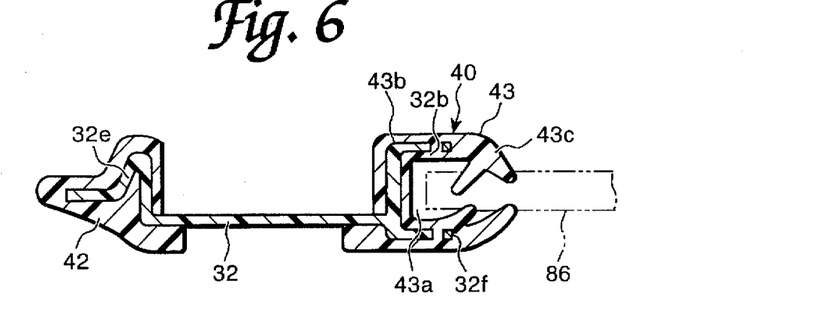
FIG. 6 is an enlarged, cross-sectional view of the corner bracket taken along line VI—VI in FIG. 3.

As shown in FIG. 6, the cover layer 40 has a bracket sealing portion 42, which covers the outer peripheral portion 32e of the main base part 32, and a glass sliding portion 43, which includes a glass sliding groove 43a that receives the sliding door window glass 86. The bracket sealing portion 42 has a generally triangular shape in the cross section on the front edge, and the bracket sealing portion 42 seals between a roof weatherstrip 85, on the front pillar 84 in FIG. 2, and an inner edge of the bracket sealing part 42.

Figure 7:
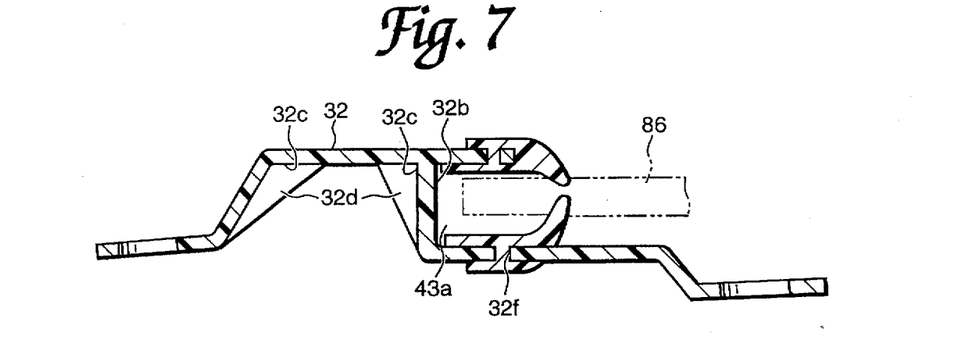
FIG. 7 is an enlarged, cross-sectional view of the corner bracket taken along line VII—VII in FIG. 3.

Also, the glass sliding portion 43 has wall portion 43b, for connecting to the hard plastic base 30, and a pair of sealing lips 43c extends from the wall portion 43b and contact both surfaces of the door window glass 86. Therefore, sealing lips 43c seal between an inside of the vehicle 80 and outside and allow the door window glass 86 to slide. Further, the shape of the glass sliding portion 43 is different at the bracket base portion 22 or the lower guide portion 24, as shown in FIGS. 6 to 8.

Also, the hard plastic base 30 includes a plurality of small holes 32f at the peripheral portion as shown in FIG. 4. When the soft material of the cover layer 40 is injected into a mold about the base 30, the soft material fills in these holes 32f and connects inside and outside. Therefore, the hard plastic base 30 is sandwiched between outer and inner portions of cover layer 40 through holes 32f. Consequently, the cover layer 40 is strongly connected to the hard plastic base 30.

The soft material of the cover layer 40, for example, can be soft polyvinyl chloride (PVC), ethylene vinyl alcohol (EVA), or polypropylene in dispersed polyethylene. The hard plastic material of the hard plastic base 30 used, for example, is saturated polyester resin (PBT), polypropylene (PP) filled in filler such as talc, glass fiber, ABS resin, polystyrene, hard polyvinyl chloride (PVC), polyphenylene oxide (PPO), foamed PP, or foamed polystyrene. Further, the hardness of the material is preferable HS 50–70 as a soft material, and more than HS 80 as a hard material. The hardness HS is measured by JIS (Japanese Industrial Standard).

Explaining the manufacturing of the corner bracket 20, first, the hard plastic base 30 is made by injection molding. The material of the hard plastic base 30 can be for example, PBT. Then, the hard plastic base 30 is set in a cavity of another injection mold as an insert. The cover layer 40, with the pair of sealing lips 43c, is made by injection molding. The material for soft cover layer 40 is preferably a homogenous or compatible material relative to the hard plastic base 30, so that the two materials have the ability of melt bonding to each other. However, in this embodiment, the cover layer 40 is soft polyvinyl chloride (PVC).

In accordance with the above embodiment, the corner bracket 20 is integrally formed with the bracket base portion 22 and the lower guide portion 24, specifically, with the hard plastic base 30 and the cover layer 40. Therefore, the corner bracket 20 includes fewer elements and the manufacturing steps and costs are reduced. For example, there is no need to connect a rail 100 to the metal supporting base 112 by welding such as in the conventional corner bracket 110.

Also, the corner bracket 20 is integrally formed with the bracket base portion 22 and the lower guide portion 24. Therefore, the rail groove 34a, which extends and continues downwardly from the groove 32b of the main base part 32, and sealing lips 43c do not have a gap therebetween. Consequently, it is possible to increase the sealing ability of these parts. It is also possible to achieve a smooth sliding door window glass 86.

Further, as noted previously, the plurality of small holes 32f at the peripheral portion of the hard plastic base 30 permit the soft material of the cover layer 40 to flow in and through these holes 32f. Therefore, the hard plastic base 30 is sandwiched within cover layer 40. Consequently, the cover layer 40 is strongly connected to the hard plastic base 30. Even if the material of the hard plastic base 30 and the cover layer 40 do not have compatibility, these holes 32f help assure a strong connection of the cover to the base.

Since the corner bracket 20 does not have any metal element, the corner bracket 20 has light weight, and will not rust.

Figure 9:
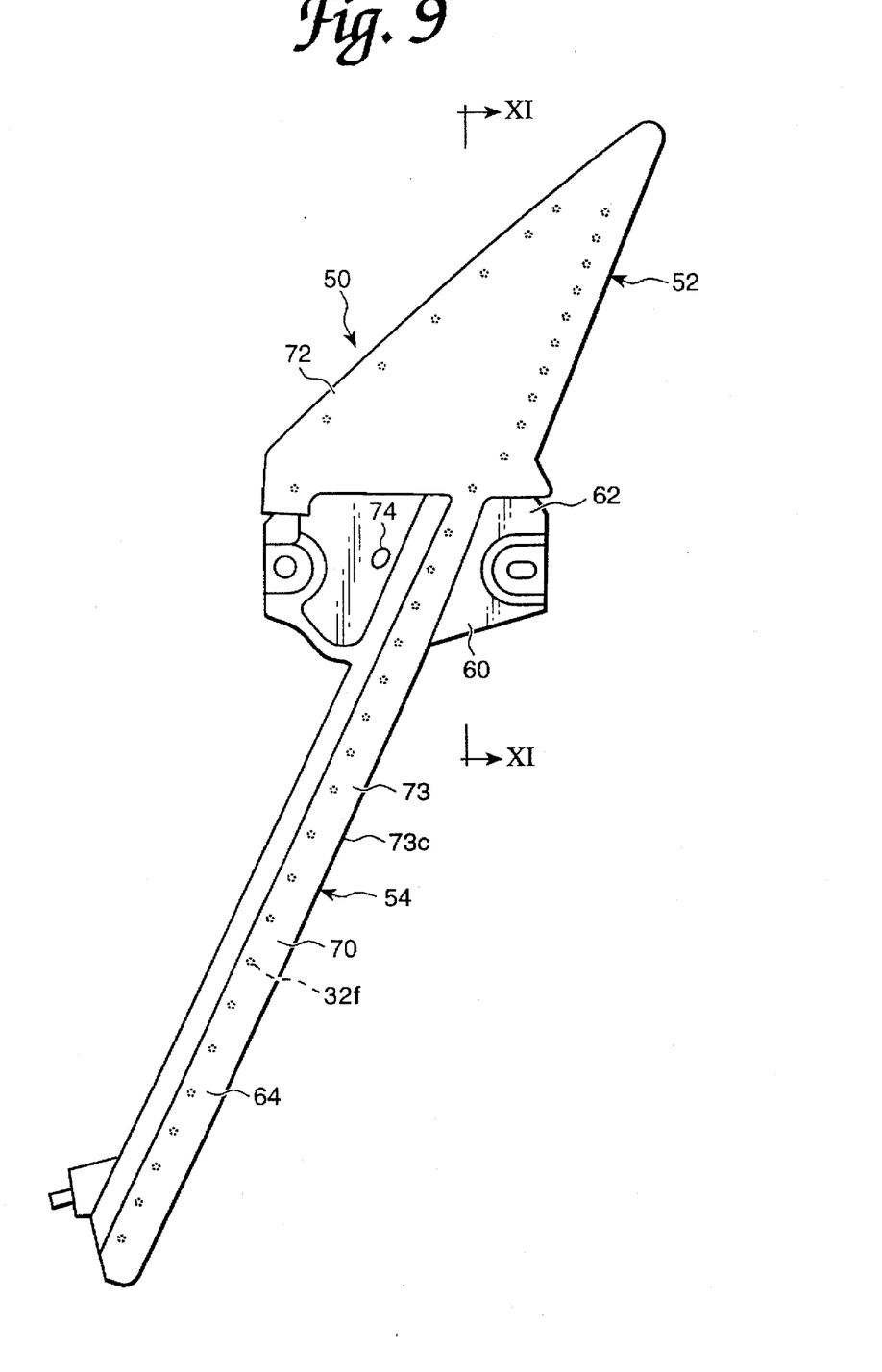
FIG. 9 is a side-elevational view showing the corner bracket of a second embodiment of the present invention.
Figures 10, 11:
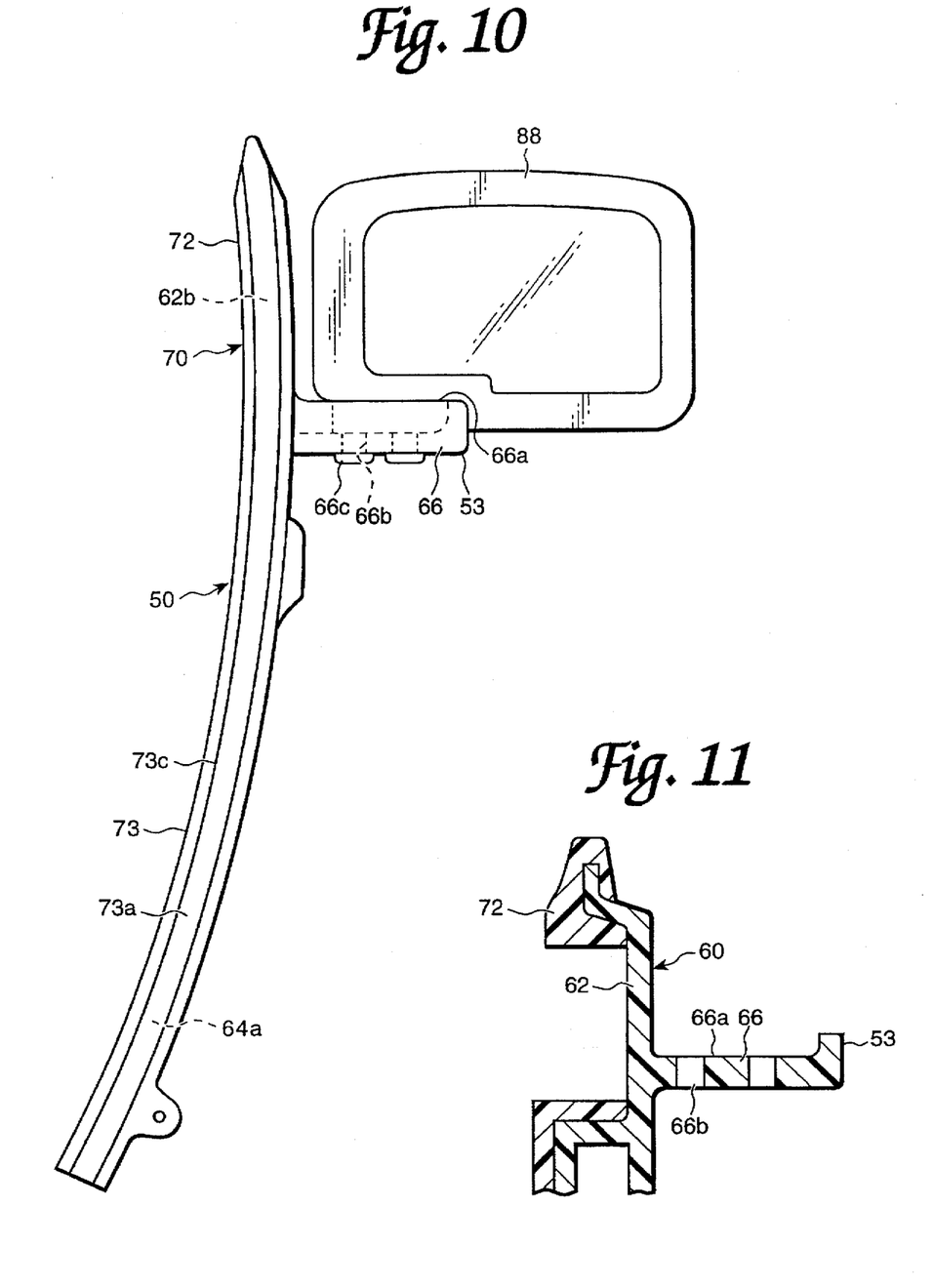
FIG. 10 is an end view showing the corner bracket of the second embodiment that includes a door mirror.
FIG. 11 is an enlarged, cross-sectional view of the corner bracket taken along line XI—XI in FIG. 9.

A second embodiment is shown in FIGS. 9 to 11, where a corner bracket 50 has a bracket base portion 52, located at upper edge corner over the door beltline 87, a mirror support portion 53, which protrudes perpendicularly from the base portion 52, and a lower guide portion 54, which is integrally formed to a lower end part of the bracket base portion 52, and extends downwardly therefrom. The second embodiment is similar to the first embodiment except for the mirror support portion 53.

As shown in FIG. 9, the bracket base portion 52 and the lower guide portion 54 are comprised of a hard plastic base 60 and a cover layer 70. The cover layer 70 has a pair of sealing lips 73c, and the cover layer 70 is made of soft plastic. The cover layer 70 covers an outer peripheral portion of the hard plastic base 60. The hard plastic base 60 is integrally formed with a main base part 62, a mirror support part 66, and a guide rail part 64. The main base part 62 is formed into a nearly triangular shape and is installed at the corner between the front pillar 84 and the door belt line 87. Further, the main base part 62 has the mirror support part 66, for supporting the door mirror 88, which protrudes perpendicularly from the main base part 62.

As shown in FIG. 11, the mirror support part 66 has a mirror support surface 66a, and fixing holes 66b to support the door mirror 88. The door mirror 88 can be fixed by screws 66c (see FIG. 10) through fixing holes 66b. Further, the main base part 62 has a hole 74 for the wire of a motor shown in FIG. 9.

Guide rail 64 has a rail groove 64a, which extends and continues downwardly from groove 62b of the main base part 62.

The cover layer 70 has a bracket sealing portion 72, which covers the outer peripheral portion of the main base part 62, and a glass sliding portion 73, which includes a glass sliding groove 73a for the purpose of receiving the sliding door window glass 86. The bracket sealing portion 72 has a generally triangular shape in cross section on the front edge, and the bracket sealing portion 72 seals between a roof weatherstrip 85 on the front pillar 84 and an inner edge of the bracket sealing portion 72.

Sealing lips 73c seal between the inside of the vehicle 80 and outside and allow the door window glass 86 to slide. Further, the shape of the glass sliding part 73 is different.

The hard plastic base 60 is provided with a plurality of small holes 32f at the peripheral portion so that the soft material of the cover layer 70, when injected into a mold, will fill in these holes and connecting inside and outside.

Therefore, the hard plastic base 70 is again sandwiched between outer and inner portions of cover layer 70. Consequently, the cover layer 70 is strongly connected to the hard plastic base 60.

In accordance with the above embodiment, the corner bracket 50 is integrally formed with the bracket base portion 52, the mirror support portion 53, which perpendicularly protrudes from the base portion 52, and the lower guide portion 54. Also, the hard plastic base 60 and the cover layer 70 are integrally formed thereby. Therefore, the corner bracket 50 can reduce the number of elements and reduce the manufacturing steps and costs.

Further, the corner bracket 50 and the door mirror 88 can be easily connected together in a vertical connecting direction.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A corner bracket of a side door for vehicles comprising:
    a bracket base portion, formed from a hard plastic material, having a window glass sliding groove extending along at least one portion;
    an integrally formed, hard plastic mirror support portion which protrudes perpendicularly from said bracket base portion; and
    a cover layer formed of soft material;
    said cover layer including sealing lips extending along of said window glass sliding groove.

2. A corner bracket as set forth in claim 1, wherein said hard plastic and said soft plastic are bondable together.

3. A corner bracket as set forth in claim 2, wherein said bracket base portion and said lower rail portion include a plurality of small holes at a peripheral portion thereof so that said soft material of said cover layer can enter and fill the plurality of holes.

4. A corner bracket as set forth in claim 1, wherein said bracket base portion and said lower rail portion include a plurality of small holes at a peripheral portion thereof so that said soft material of said cover layer passes through and fills the plurality of holes.

* * * * *